United States Patent [19]

Robertson

[11] Patent Number: 4,736,730
[45] Date of Patent: Apr. 12, 1988

[54] HEATING SYSTEM

[76] Inventor: Andrew S. Robertson, 1034 Leland Dr., Lafayette, Calif. 94549

[21] Appl. No.: 89,928

[22] Filed: Aug. 25, 1987

Related U.S. Application Data

[63] Continuation of Ser. No. 582,300, Feb. 22, 1984, abandoned.

[51] Int. Cl.[4] .............................................. F24B 7/00
[52] U.S. Cl. ....................................... 126/123; 237/55; 126/110 AA
[58] Field of Search ........... 126/117, 112, 77, 110 AA, 126/123, 143, 242, 121, 153, 160, 152 R, 152 B; 122/203, 283; 237/55

[56] References Cited

U.S. PATENT DOCUMENTS

| 526,973 | 10/1894 | Keller | 126/152 R |
|---|---|---|---|
| 1,561,543 | 11/1925 | Hoult | 126/153 |
| 1,596,922 | 8/1926 | Clerenger | 126/112 |
| 2,274,341 | 2/1942 | Mueller | 237/55 |
| 2,348,834 | 5/1944 | Mueller | 237/55 |
| 2,385,652 | 9/1945 | Rifle | 237/55 |
| 2,634,720 | 4/1953 | Thulman | 237/55 |
| 2,711,683 | 6/1955 | Ryder | 98/48 |
| 2,764,972 | 10/1956 | Ryder | 126/307 |
| 2,863,443 | 12/1958 | Hofhman | 126/143 |
| 3,090,374 | 5/1963 | Allen | 126/110 |
| 3,724,443 | 4/1973 | Carson | 126/121 |
| 4,015,579 | 4/1977 | Wirth et al. | 126/121 |
| 4,074,680 | 2/1978 | Gooding | 126/143 |
| 4,154,215 | 5/1979 | Tjernström | 126/121 |
| 4,157,704 | 6/1979 | Zimmer | 126/143 |
| 4,184,473 | 1/1980 | McIntire | 126/77 |
| 4,206,875 | 6/1980 | Grasso | 237/55 |
| 4,224,921 | 8/1980 | Petrescue | 126/121 |
| 4,243,015 | 1/1981 | Trytter | 126/121 |
| 4,270,513 | 6/1981 | Mitchelson | 237/55 |
| 4,276,926 | 7/1981 | Evangelow | 165/DIG. 2 |
| 4,325,353 | 4/1982 | Husa | 126/121 |
| 4,325,430 | 4/1982 | Husa | 237/55 |
| 4,343,288 | 8/1982 | Tjosuold | 126/112 |
| 4,349,009 | 9/1982 | Patterson et al. | 165/DIG. 2 |
| 4,372,288 | 2/1983 | Nicholas | 126/143 |
| 4,409,956 | 10/1983 | Barnett | 126/290 |
| 4,426,991 | 1/1984 | Stevenson | 126/160 |
| 4,440,213 | 4/1984 | Sarvis | 237/55 |
| 4,462,385 | 7/1984 | Dragon | 237/55 |
| 4,469,085 | 9/1984 | Driesmans | 126/160 |
| 4,469,276 | 9/1984 | Marcum | 126/121 |
| 4,471,755 | 9/1984 | Faehling | 126/112 |

FOREIGN PATENT DOCUMENTS

| 218678 | 2/1909 | Fed. Rep. of Germany . | |
|---|---|---|---|
| 3308700 | 12/1983 | Fed. Rep. of Germany | 126/117 |
| 2506430 | 11/1982 | France | 126/143 |
| 30593 | 4/1911 | Sweden | 126/160 |

Primary Examiner—Samuel Scott
Assistant Examiner—H. A. Odar
Attorney, Agent, or Firm—Flehr, Hohbach, Test, Albritton & Herbert

[57] ABSTRACT

A heating system comprising a firebox defining a combustion chamber that is substantially sealed from the atmosphere. The system includes a flue for conducting combustion gases from the combustion chamber. A first duct surrounds the flue and defines an inner passageway with respect thereto. A second duct surrounds the first duct and defines an outer passageway. An inlet means is provided for introducing ambient air into the outer passageway. The air in the outer passageway is drawn through the inner passageway by a negative pressure in the combustion chamber. The ambient air in the inner and outer passageways is heated by heat transmitted from the flue. This heated ambient air is then introduced in the combustion chamber to improve the efficiency of combustion.

17 Claims, 4 Drawing Sheets

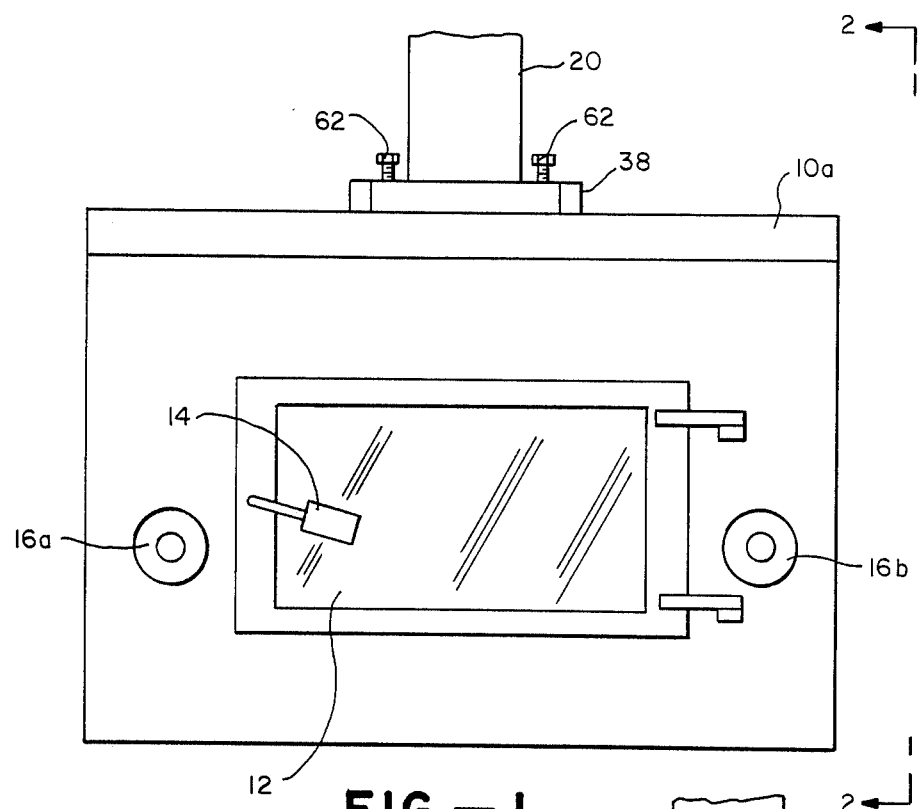
FIG.—1
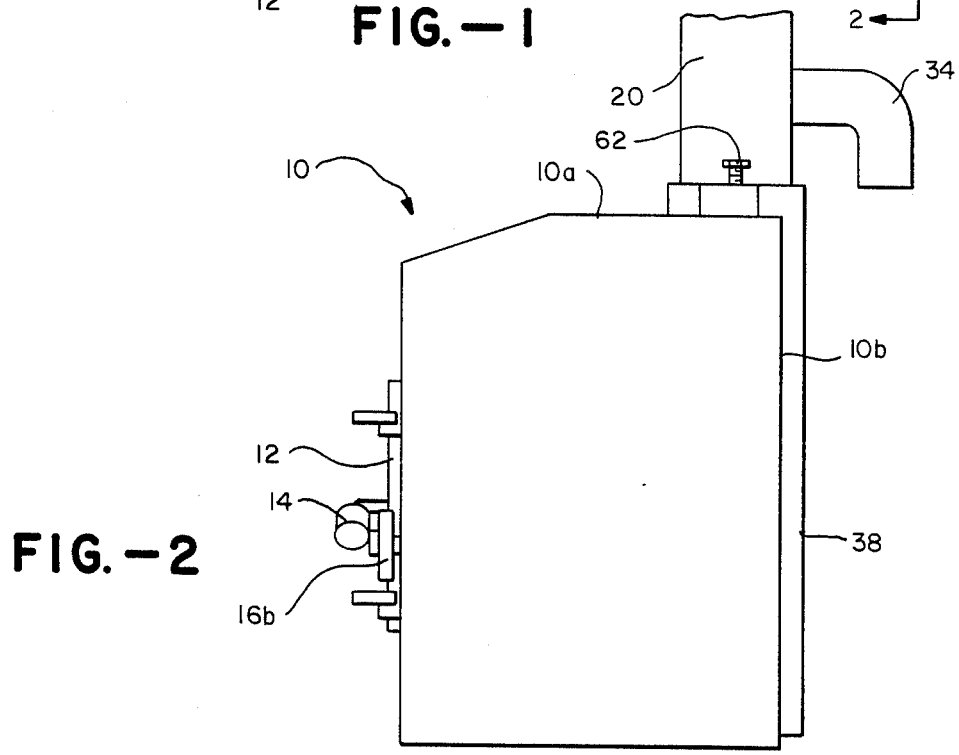
FIG.—2

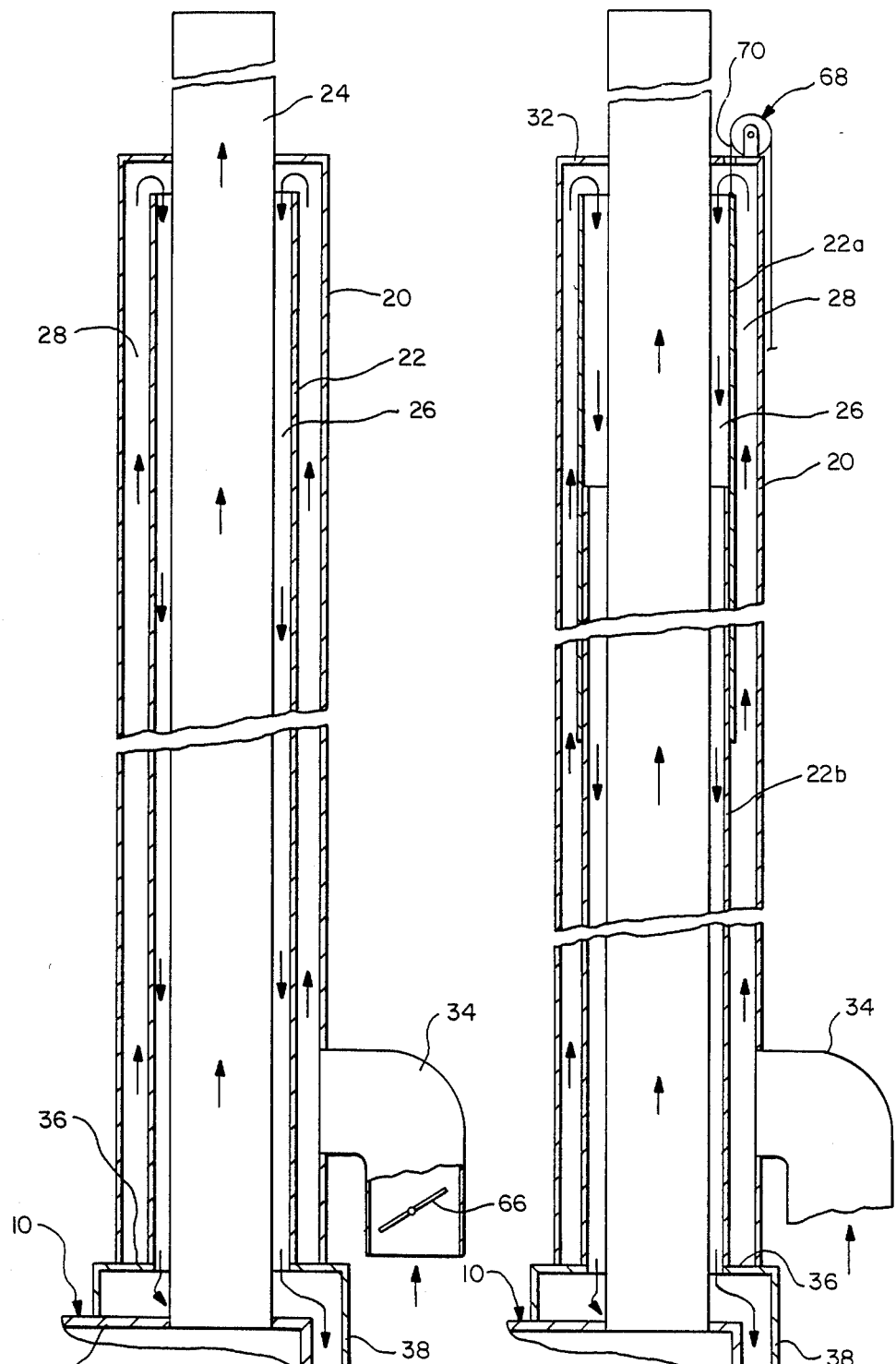

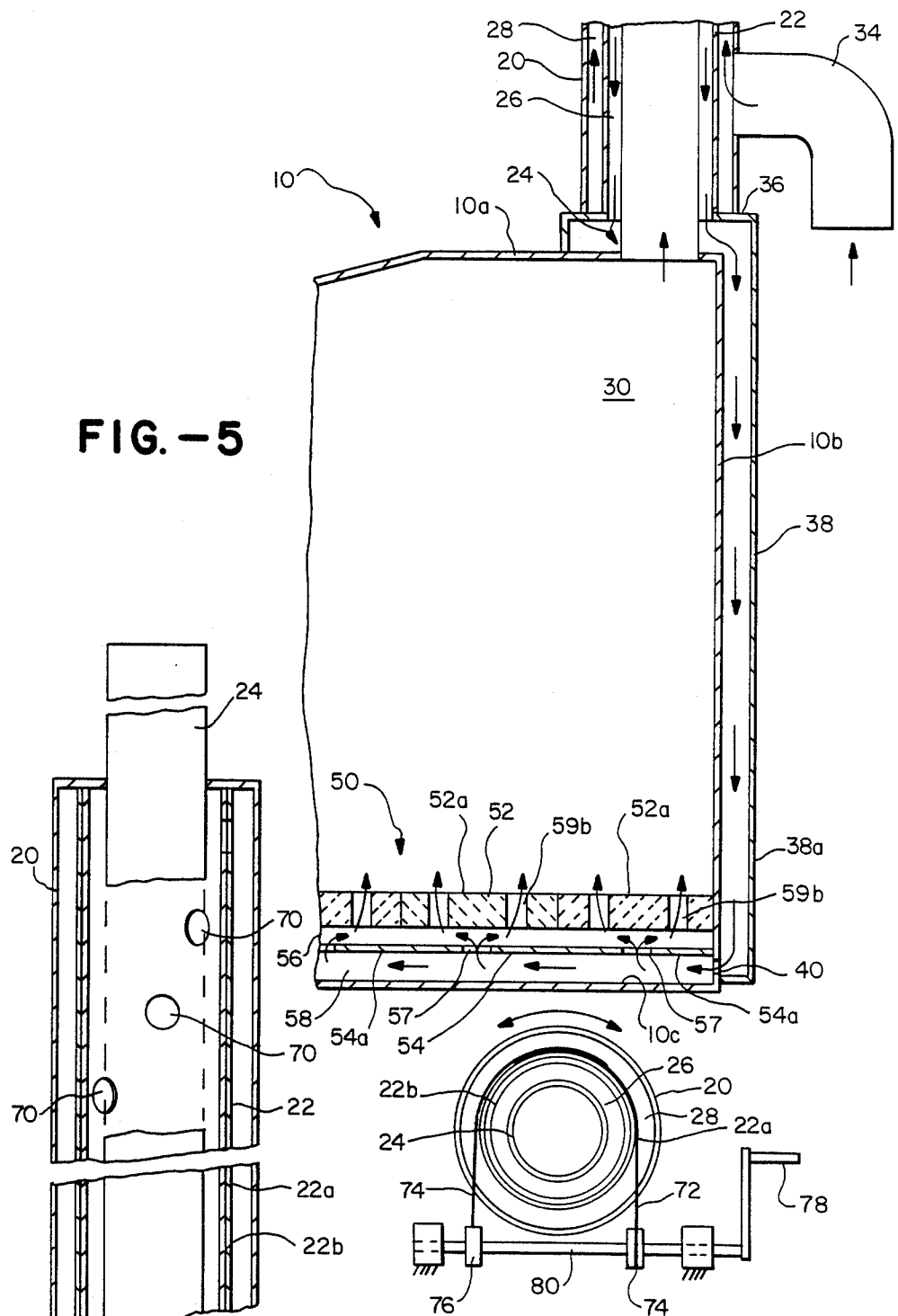

HEATING SYSTEM

This is a continuation of application Ser. No. 582,300 filed Feb. 22, 1984, now abandoned.

The present invention relates generally to heating systems, and more particularly to a hypobaric countercurrent heat exchange system for use, for instance in a fireplace, for supplying heated air to a space in a building.

Most existing fireplaces draw on air from within a space in a building for their principal or sole support for combustion resulting in a substantial loss of air up the flue. Operation of this sort of fireplace on a cold day may actually cause a net heat loss or cool the building instead of warming it as cold outside air is drawn into the building to replace the air lost up the flue. Such loss may be reduced by the use of glass doors in the front of the firebox which allow the flow of air from the building to be controlled. At a minimum, however, sufficient air must be admitted into the firebox to support adequate combustion.

Due to ever-escalating energy costs, both consumers and governmental authorities have recognized the importance and desirability of increasing the efficiency of such heating apparatus as fireplaces and wood-burning stoves. One scheme proposed heretofore for decreasing the amount of heated air lost up the flue of a fireplace, and thus increasing its efficiency, calls for providing the fireplace with a source of combustion air from outside the atmosphere of the building to be heated. To be most effective, the use of such outside air is typically coupled with the use of glass doors to seal the firebox from the atmosphere of the building. In such designs, outside air may be introduced into the firebox by means of a supplementary vent running through a nearby exterior wall adjacent to the flue. Such designs offer an improvement over prior fireplace designs; however, much more is needed in terms of increasing the efficiency of operation of a fireplace or other such heating apparatus.

Accordingly, an object of the present invention is to provide an extremely efficient means for supplying heated air to a space in a building using, for instance, the operating characteristics of a fireplace.

Another object of the present invention is to provide a heating system for supplying preheated ambient air to a combustion chamber for increased efficiency of combustion.

Another object of the present invention is to provide a prefabricated fireplace apparatus which may be installed in a presently existing or newly constructed building.

As may be seen hereinafter, the heating system disclosed herein is one which utilizes a hypobaric pressure countercurrent heat exchange effect. The system is adapted to provide preheated ambient air to a combustion chamber for increased efficiency of combustion. The fuel of combustion may be firewood, natural gas, a combination of firewood and natural gas, or other heating fuels. The heating system of the present invention is specifically adapted for supplying heated air to a space in a building wherein the system may be installed in a presently existing or newly built fireplace. The system, however, may also be used separate and apart from a fireplace.

The heating system of the present invention comprises a firebox defining a combustion chamber that is substantially sealed from the atmosphere. A flue is provided for conducting combustion gases from the combustion chamber. A first duct surrounds the flue and is spaced therefrom to define an inner passageway. A second duct surrounds the first duct and is spaced therefrom to define an outer passageway. The second duct has inlet means for the flow of ambient air into the outer passageway. The first and second ducts have air flow communication at their upper ends to provide for inducing a countercurrent airflow in the inner and outer passageways as a result of a hypobaric or negative pressure in the combustion chamber. Heat transmitted from the flue heats the air flowing in the inner and outer passageways. The second duct further includes an outlet means in air communication with the combustion chamber for introducing the air heated in the inner passageway into the combustion chamber to thereby improve the efficiency of combustion.

The heating system of the present invention further includes control means for controlling the amount of ambient air drawn into the outer passageway to thus control combustion. The heating system of the present invention may further include an air intake dispenser and ash collection grate at the bottom of the firebox for introducing preheated air from the inner passageway into the combustion chamber. The air intake dispenser and ash collection grate also provides a means for preventing ash residue from blocking the flow of preheated air into the combustion chamber as well as a convenient means of collecting and disposing of ash residue.

The heating system of the present invention will be described in more detail hereinafter in conjunction with the drawings wherein:

FIG. 1 is a schematic view which illustrates the firebox of the heating system of the present invention;

FIG. 2 is a view along line 2—2 of FIG. 1;

FIGS. 3 and 4 are schematic views illustrating the duct and flue arrangement of the heating system of the present invention as well as alternate means for regulating combustion;

FIG. 5 is a schematic view of the combustion chamber of the heating system of the present invention, and the air intake dispenser and ash collection grate;

Figures 7, 8:
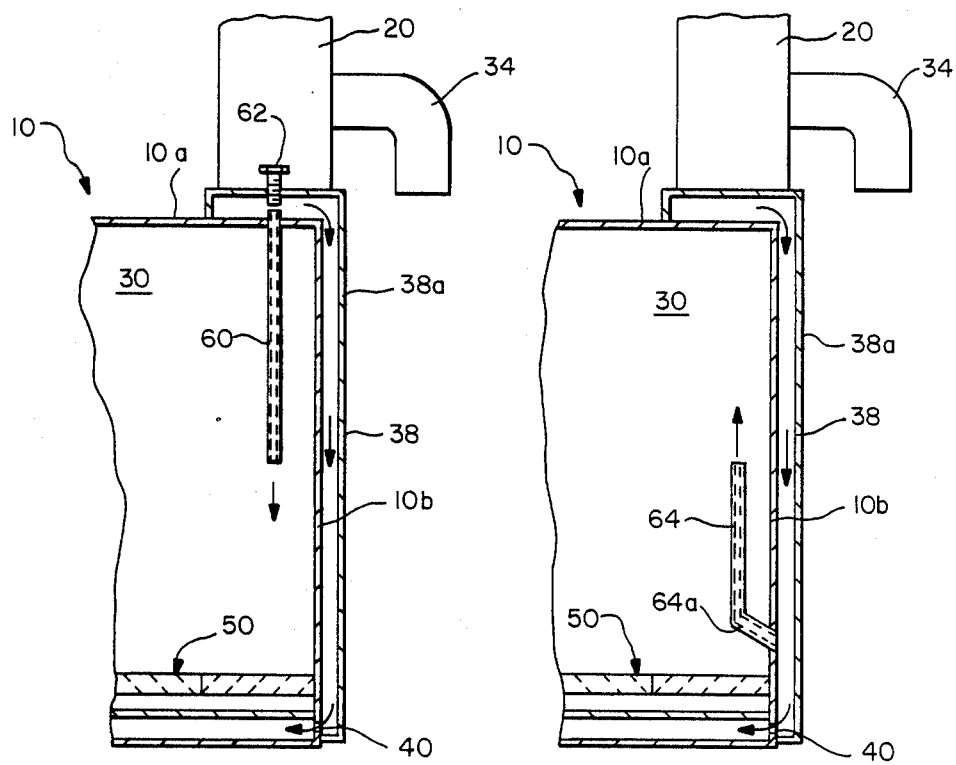

FIGS. 7 and 8 schematically illustrate alternate embodiments for supplying a secondary source of preheated air to the combustion chamber of the heating system of the present invention; and FIGS. 9 and 10 schematically illustrate yet another embodiment for regulating combustion.

Referring now to the drawings, in which like components are designated by like reference numerals throughout the various figures, attention is first directed to FIGS. 1 and 2. FIGS. 1 and 2 show a firebox, which is generally represented by reference numeral 10, and an outermost duct 20 of the heating system of the present invention. Firebox 10 is constructed of a suitable material such as steel, and it includes a door 12 and appropriate handle 14 for gaining access to a combustion chamber defined by the firebox. Door 12 is provided with an appropriate sealing means around the outer edges thereof to effect a hermetic seal such that the combustion chamber defined by the firebox is substantially sealed from the atmosphere.

Firebox 10 also preferably includes means for introducing ambient or cold air into the combustion chamber prior to and for the initiation of combustion. To this end, respective openings or airflow passageways may be formed on either side of door 12. Appropriate means such as screw control valves 16a and 16b are provided for opening and closing these openings. When initiating combustion, valves 16a and 16b are opened to feed cold air into the combustion chamber. After combustion has been initiated, the valves may be screwed down to close-off the openings.

The particular apparatus of the present invention illustrated is especially suitable for providing a prefabricated fireplace apparatus which may be installed in a presently existing or newly constructed building wherein the duct and flue arrangement is installed in the chimney of such a building. The apparatus of the present invention, however, may also be utilized as a free-standing, heat-providing stove separate and apart from any fireplace construction. The heating system of the present invention would provide heated air to a house, for example by the use of firewood, natural gas, a combination of firewood and natural gas, or other heating fuels as the source of combustion.

FIGS. 3 and 5 illustrate the flue and duct arrangement of the heating system of the present invention. As shown, a flue 24 is connected at the upper end of firebox 10 to be in air communication with combustion chamber 30. Flue 24 is adapted to discharge combustion gases into the atmosphere. A first or innermost duct 22 surrounds the flue and is spaced therefrom to define an inner passageway 26 between flue 24 and duct 22. A second or outermost duct 20 surrounds the first duct and is spaced therefrom to define an outer passageway 28 between first duct 22 and second duct 20. The first and second ducts and the flue may have a cylindrical shape and be coaxially arranged relative to one another. The ducts and the flue, however, may have any other suitable shape such as elliptical. The flue and ducts may be constructed of steel.

The upper end of duct 20 is closed by a plate 32 appropriately affixed to the walls of the duct and including a central sealed opening formed therein through which flue 24 passes. The upper end of duct 22 is spaced below plate 32 to provide air flow communication between outer passageway 28 and inner passageway 26.

Outermost duct 20 further includes an inlet port 34 through which ambient air passes into outer passageway 28. (In each of the Figures, the flow of air into and through the heating system of the present invention is represented by solid arrows.) As illustrated, a second plate or member 36 is provided at the bottom of duct 20 to effectively close that end of the duct. Plate 36 would include appropriate concentric openings formed therein for the passage of inner duct 22 and flue 24 therethrough. The point at which duct 22 and flue 24 pass through plate 36 would obviously be sealed to prevent the leakage of air.

The lower end of duct 22 is in air communication with an airflow manifold or other suitable air communication means 38 for flowing air from inner passageway 26 into combustion chamber 30. As shown in FIG. 5, airflow manifold 38 comprises a channel section for the flow of air therethrough extending from the lower end of duct 22 at the top of firebox 10 and along the backside thereof to a suitable port or opening 40 at a lower portion of the firebox.

The lower end of duct 22 is secured to channel section 38 such that there is airflow communication between the inner passageway 26 and channel section 38. Channel section 38 may be defined by the upper and back walls of the firebox 10a and 10b, respectively, and by a wall section 38a that is constructed of a suitable metal, such as steel.

Figure 6:
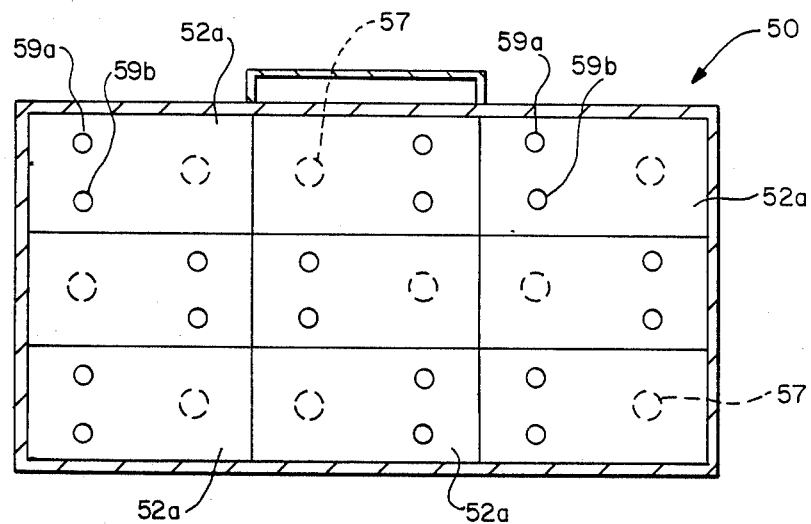
FIG. 6 is a schematic plan view of the air intake dispenser and ash collection grate.

Port 40 in the lower portion of firebox 10 is in airflow communication with an air intake dispenser and ash collection grate, represented by reference numeral 50, which is located in the firebox at the bottom of combustion chamber 30. The device 50 is utilized to flow heated air from inner passageway 26 via channel section 38 into combustion chamber 30. Device 50 may comprise two spaced and substantially parallel members 52 and 54 exending across the bottom of the firebox and defining an airflow channel 56 therebetween. Member 54 is also substantially parallel to and spaced from the floor or bottom surface 10c of firebox 10 to define a second airflow channel 58. In the preferred embodiment, each member 52 and 54 comprises a plurality of rectangular and segmented sections or units 52a and 54a, respectively (See FIGS. 5 and 6). Such an arrangement facilitates installation and removal of members 52 and 54 as well as providing a convenient means for the removal of ash residue from the bottom of firebox 10.

Preferably, each segment 54a of member 54 is formed of a steel plate and includes one opening or hole 57 formed therein. Each segment 52a of member 52 is preferably formed of a firebrick and includes two holes 59a and 59b formed therein. The diameter of holes 59a and 59b is substantially equal, and the diameter of hole 57 is larger than the diameter of holes 59a and 59b. As shown, holes 59a and 59b in segments 52a are offset from holes 57 in respective segments 54a.

The respective holes in segments 52a and 54a provide airflow communication from channel sections 56 and 58 into combustion chamber 30. Any ash residue produced as a result of combustion will be collected for the most part in channel section 56. Since the respective holes in members 52a and 54a are offset from one another, the ash residue will not block the flow of air into the combustion chamber.

In operation, after combustion has begun, the hot combustion gases produced in combustion chamber 30 will escape through flue 24 and normal ambient air will be drawn into the outer passageway 28 via inlet port 34. As the ambient air enters outer passageway 28 and flows therethrough in an upward direction, it will be slightly heated as the temperature of the walls of duct 22 is greater than the temperature of the ambient air due to the heat being transmitted by the combustion gases flowing in flue 24. At the upper end of passageway 28, the airflow will turn downward as illustrated (See FIG. 3) and flow through inner passageway 26 where air is subjected to additional heating as it contacts the hot walls of flue 24. The transfer of heat from the combustion gases in the flue to the air flowing in the inner and outer passageway is effected by radiation and convection. Combustion in the combustion chamber creates a negative or hypobaric pressure in the combustion chamber relative to the atmosphere or ambient pressure, resulting in ambient air being drawn into inlet 34 and providing for the countercurrent airflow in the outer passageway 28 (airflow up) and the inner passageway 26 (airflow down).

As discussed heretofore, the heated air from inner passageway 26 is drawn into combustion chamber 30 through channel section 38 and air intake dispenser means 50. The introduction of preheated or heated ambient air into the combustion chamber 30 greatly enhances the efficiency of combustion. Particularly, it has been found that utilizing the features of the present invention, combustion under reduced pressure in the combustion chamber will take place at a much slower, more efficient rate, using less fuel while producing a very warm fire with very little smoke and ash residue. For example, the temperature, as measured at the external surface of the firebox, may be maintained at approximately 600° F. for approximately 6 hours while burning approximately half the wood consumed by a typical Franklin-type wood-burning stove.

Even more efficient and more complete combustion may be accomplished with the introduction of a secondary source of preheated air, that is, the air heated in the inner and outer passageways, into the combustion chamber. FIGS. 7 and 8 illustrate different arrangements for accomplishing this. FIG. 7 shows a secondary feed tube 60 extending through the upper wall 10a of firebox 10 to be an airflow communication with that portion of channel section 38 that extends across the upper surface of 10a the firebox. The secondary source of preheated ambient air is preferably introduced in the combustion chamber at a point above that where the primary source of preheated ambient air enters the combustion chamber, that is, at port 40 through dispenser means 50. The volume of the secondary source of preheated air entering the combustion chamber is less than that of the primary source entering the combustion chamber through port 40. Preferably, two secondary feed tubes 60 are provided, one on either side of outer duct 20 (See FIG. 1). A control means, such as a screw valve 62, may also be provided for controlling the flow of preheated ambient air into the feed tube and thus into the combustion chamber.

FIG. 8 shows another arrangement for introducing a secondary source of preheated air into the combustion chamber. As shown, this arrangement comprises two feed tubes 64 (only one of which is shown) that extend through the back wall 10b of firebox 10 to be in airflow communication with channel section 38. Feed tubes 64 may have a slight bend formed therein as at 64a to facilitate the integration of the secondary air source into the combustion chamber.

The inside diameter of feed tubes 60 and 64 may be between approximately ½ and ¾ of an inch. The secondary feed tube arrangement has been found to further enhance the efficiency of combustion, as it ensures more complete combustion of all flammable gases and products distilled from the fuel. Such more complete combustion may take place at an optimal high temperature of approximately 750° F.

The present invention further includes means for controlling the amount of ambient air drawn into inlet 34, thereby regulating combustion in combustion chamber 30. FIG. 3 illustrates one such means which comprises a butterfly valve 66 located at inlet 34. The butterfly valve may be selectively positioned to alter the cross-sectional area of inlet 34 thereby controlling the amount of air entering inlet 34.

Another arrangement for controlling combustion is illustrated in FIG. 4. In this embodiment, inner duct 22 may comprise two substantially cylindrical wall sections 22a and 22b coaxially arranged with respect to one another. Wall section 22b is fixed and joined at its lower end to plate member 36. Wall section 22a is slidably disposed with respect to wall section 22b to move up and down relative thereto. To effect this movement, a pulley and cable arrangement is provided. A control wire 70 of a control pulley 68 is connected at an upper end of wall section 22a and extends over the pulley down to the front of the firebox to permit operation thereof. Raising or lowering wall section 22a alters the effective height of inner duct 22 with respect to outer duct 20. This has the effect of regulating combustion in the combustion chamber. At the maximum height of wall section 22a with airflow communication between the inner and outer passageways, a greater reduction in pressure in the combustion chamber is needed to draw air down through the inner passageway against convection so a minimum amount of preheated ambient air is fed into the combustion chamber, resulting in a very slow burning fire. However, the length of the heat exchange path (the relative length of the inner passageway) is at its maximum so maximum heat transfer and thus efficiency is achieved. Lowering wall section 22a relative to outer duct 20 increases the amount of preheated air drawn into the combustion chamber providing a faster burning fire at a reduced pressure. Decreasing the relative length of the inner passageway, reduces the amount of pressure reduction required in the combustion chamber to draw air through the inner passageway, while decreasing the length of the heat exchange path. In this manner, the amount as well as the temperature of preheated air drawn into the combustion chamber is varied to regulate combustion wherein the efficiency of the heat exchange and the rate of combustion are simultaneously altered.

In one embodiment, the inlet port 34 may have an inside diameter of between 3 to 6 inches, the flue an inside diameter of 3 inches, and the outer duct an inside diameter of 6 inches. The inner duct 22 would comprise a wall section 22b having an inside diameter of 4 inches and a wall section 22a having an inside diameter of 4½ inches, to thereby permit wall section 22a to be moved up and down relative to wall section 22b. Measured from the top of plate 36, the length of the outer duct 20 would be approximately 12 feet. Measured from this same point, the length of wall section 22b would be approximately 8 feet with wall section 22a slidably disposed with respect thereto to increase the effective height of the inner duct up to 12 feet (the effective height of the inner duct may thus be varied between 8 and 12 feet). If wall section 22a is positioned such that the effective height of the inner duct 22 is substantially equal to that of the outer duct, preheated air will not be supplied to the combustion chamber as there is no effective airflow communication between the inner and outer passageways 26 and 28, respectively. It is thought that the optimum combustion will be produced when the total effective height or length of inner duct 22 is approximately 11 feet, providing a 1 foot space or gap between the top of inner duct wall section 22a and plate 32. It should be understood, however, that combustion will be maintained in the combustion chamber with a gap as small as 1 or 2 inches between the top of wall section 22a and plate 32.

Other embodiments of the heating system of the present invention may, of course, be constructed. However, it is believed that for best performance of the present invention, the length of the inner passageway and thus the effective length of the inner duct should be in the range of approximately 6 to 12 feet.

FIGS. 9 and 10 show another embodiment for regulating combustion. This embodiment is somewhat similar to the embodiment depicted in FIG. 4. However, rather than having wall section 22a slidably disposed with respect to wall section 22b to move up and down with respect thereto, wall section 22a is rotatably disposed with respect to wall section 22b. Wall sections 22a and 22b include respective openings 70 formed therein such that the openings in one wall section may be aligned with the openings in the other wall section to provide airflow communication therebetween. As shown, the holes in the respective wall sections are staggered so that by rotation of wall section 22a the holes in the respective wall sections may be brought into selected alignment to vary from a position where all holes in the respective wall sections are aligned (maximum flow of preheated air into the combustion chamber) to a position where none of the holes are aligned (no flow of preheated air into the combustion chamber). It should be understood that wall section 22a may be rotated to be in a position intermediate of these two extremes where not all but some of the holes in the wall sections 22a and 22b are in alignment to provide airflow communication between inner and outer passageways 26 and 28, respectively.

FIG. 10 illustrates an apparatus for accomplishing the rotation of wall section 22a relative to wall section 22b. Particularly, a first cable 72 extends over a first sheave 74 to be connected at a first point on wall section 22a. A second cable 74 extends under a second sheave 76 to be connected at a second point on wall section 22a. The sheaves are mounted on a shaft 80 which is joined to a crank 78. Turning crank 78 causes the sheaves to rotate either taking in or feeding out cable, depending upon in which direction crank 78 is turned. Thus, by so operating crank 78 wall section 22a may be rotated relative to wall section 22b to vary the amount of preheated air entering the combustion chamber, thereby effectively regulating combustion.

Although not illustrated, a water jacket could be positioned around firebox 10 or portions thereof to help cool the external surfaces of the firebox.

Although certain specific embodiments of the present invention have been described herein in detail, the invention is not to be limited only to such embodiments, but rather only by the appended claims.

What is claimed is:

1. A heating system for use in a fireplace, for instance, comprising:
   a combustion chamber;
   a flue for conducting combustion gases from said combustion chamber;
   a first duct surrounding said flue, said first duct and said flue defining between them an inner passageway;
   a second duct surrounding said first duct, said first and second ducts defining between them an outer passageway;
   said second duct having inlet and outlet means for the flow of ambient air through said outer passageway;
   said first duct having inlet means in communication with the outlet means of said second duct for the flow of air from said outer passageway into said inner passageway; and
   said first duct further including outlet means in communication with an air intake disperser means at the bottom of said combustion chamber for the flow of air from said inner passageway into said combustion chamber at the bottom thereof as a primary source of air, said flow of air into said combustion chamber from said inner passageway a result of a hypobaric pressure in said combustion chamber.

2. A heating system for supplying heated air to a space in a building, for instance, for heating such space, comprising:
   a firebox defining a combustion chamber that is substantially sealed from the atmosphere, said combustion chamber having top, side and bottom portions;
   a flue for conducting combustion gases from said combustion chamber;
   a first duct surrounding said flue and spaced therefrom to define an inner passageway between said flue and said first duct;
   a second duct surrounding said first duct and spaced therefrom to define an outer passageway between said first and second ducts;
   said second duct having inlet means for the flow of ambient air into said outer passageway;
   said first and second ducts adapted to have airflow communication at their upper ends to provide for the induction of countercurrent airflow in said inner and outer passageways as a result of a pressure in said combustion chamber less than the ambient pressure wherein heat transmitted from said flue heats the air in said inner passageway; and
   said first duct including outlet means in air communication with an air intake dispenser at the bottom portion of said combustion chamber for introducing air heated in said inner passageway into said combustion chamber at the bottom thereof as a primary source of air to improve the efficiency of combustion.

3. The heating system of claim 2 further including control means for selectively controlling the amount of ambient air drawn into said outer passageway by varying the effective opening of said outer passageway between substantially closed and open, and intermediate positions therebetween.

4. The heating system of claim 3 wherein said control means comprises a valve means located at the inlet means of said second duct.

5. The heating system of claim 3 wherein said first and second ducts comprise inner and outer walls, respectively, and said control means comprises means for varying the effective height of said inner wall relative to said outer wall.

6. The heating system of claim 5 wherein said control means comprises a cable and pulley arrangement for raising and lowering said inner wall relative to said outer wall.

7. The heating system of claim 3 wherein said first duct comprises two wall sections concentrically arranged, each of said wall sections including openings formed therein such that openings in one wall section may be aligned with openings in the other wall section to provide airflow communication between said inner and outer passageways, and said control means comprises means for selectively aligning said openings formed in said wall sections.

8. The heating system of claim 2 further including secondary means for introducing air heated in said inner passageway into said combustion chamber, such air introduced above the point at which air from the outlet means of said first duct is introduced into said combustion chamber.

9. The heating system of claim 2 further including means for introducing into said combustion chamber as a secondary source, air heated in said inner passageway.

10. The heating system of claim 9 wherein said secondary source means comprises at least one tube extending through a wall of the firebox and into said combustion chamber to introduce air heated in said inner passageway therein, said tube extending into said combustion chamber at a location above the outlet means of said first duct.

11. The heating system of claim 9 further including means for controlling the amount of air introduced into said combustion chamber by said secondary source means.

12. The heating system of claim 2 wherein the outlet means of said first duct is in communication with said combustion chamber at a lower portion thereof.

13. The heating system of claims 2, 3, 4, 5, 6, 7 or 8 wherein the outlet means of said first duct is in air communication with an air intake dispenser and ash residue collection means at the bottom of the firebox for introducing air heated in said inner passageway into said combustion chamber and for collecting ash residue.

14. The heating system of claim 13 wherein said air intake dispenser and ash residue collection means comprise:
 a first member having a first series of holes formed therein and defining a first channel in air communication with the outlet of said first duct of the flow of air therethrough; and
 a second member located above and positioned substantially parallel to said first member to define a second channel for the flow of air therethrough, said second member having a second series of holes formed therein for the introduction of air into said combustion chamber from said first and second channels wherein said holes of said first series are offset from said holes of said second series.

15. The heating system of claim 14 wherein the diameter of said holes of said second series in said second member is less than the diameter of said holes of said first series in said first member.

16. The heating system of claim 14 wherein said first and second members each comprise a plurality segmented units.

17. A heating system for supplying heated air to a space in a building, for instance, for heating such space, comprising:
 a firebox defining a combustion chamber that is substantially sealed from the atmosphere, said combustion chamber having top, side and bottom walls;
 a flue for conducting combustion gases from said combustion chamber;
 a first duct surrounding said flue and spaced therefrom to define an inner passageway between said flue and said first duct;
 a second duct surrounding said first duct and spaced therefrom to define an outer passageway between said first and second ducts;
 said second duct having inlet means for the flow of ambient air into said outer passageway;
 said first and second ducts adapted to have airflow communication at their upper ends to provide for the induction of countercurrent airflow in said inner and outer passageways as a result of a pressure in said combustion chamber less than the ambient pressure wherein heat transmitted from said flue heats the air in said inner passageway;
 said first duct including outlet means in air communication with said combustion chamber for introducing air heated in said inner passageway into said combustion chamber to improve the efficiency of combustion;
 a first member at the bottom wall of said combustion chamber having a first series of holes formed therein and defining a first channel in air communication with the outlet of said first duct for introducing air heated in said inner passageway into said combustion chamber at the bottom thereof as a primary source of air to improve the efficiency of combustion; and
 a second member located above and positioned substantially parallel to said first member to define a second channel for the flow of air therethrough from said first channel, said second member having a second series of holes formed therein for the introduction of air into said combustion chamber from said first and second channels wherein said holes of said first series are offset from said holes of said second series.

* * * * *

UNITED STATES PATENT AND TRADEMARK OFFICE
CERTIFICATE OF CORRECTION

PATENT NO. : 4,736,730
DATED : April 12, 1988
INVENTOR(S) : Andrew S. Robertson

It is certified that error appears in the above-identified patent and that said Letters Patent are hereby corrected as shown below:

In Column 9 at line 24 please delete ". . . of the flow. . ."
and insert " . . . for the flow. . ."

Signed and Sealed this

Eleventh Day of October, 1988

Attest:

DONALD J. QUIGG

*Attesting Officer*  *Commissioner of Patents and Trademarks*